United States Patent [19]
DeKoning et al.

[11] Patent Number: 5,975,738
[45] Date of Patent: Nov. 2, 1999

[54] METHOD FOR DETECTING FAILURE IN REDUNDANT CONTROLLERS USING A PRIVATE LUN

[75] Inventors: Rodney A. DeKoning; Gerald J. Fredin; Charles D. Binford, all of Wichita, Kans.

[73] Assignee: LSI Logic Corporation, Milpitas, Calif.

[21] Appl. No.: 08/941,894

[22] Filed: Sep. 30, 1997

[51] Int. Cl.$^6$ .................................................. G06F 13/00
[52] U.S. Cl. ............................................ 364/184; 714/42
[58] Field of Search ........................ 364/184; 395/182.2, 395/182.07, 182.04; 711/147, 114

[56] References Cited

U.S. PATENT DOCUMENTS

| | | | |
|---|---|---|---|
| 4,007,448 | 2/1977 | Sergeant et al. | 340/172.5 |
| 5,166,939 | 11/1992 | Jaffe et al. | 371/40.1 |
| 5,239,632 | 8/1993 | Larner | 395/325 |
| 5,379,417 | 1/1995 | Lui et al. | 395/575 |
| 5,459,857 | 10/1995 | Ludlam et al. | 395/182.04 |
| 5,504,882 | 4/1996 | Chai et al. | 395/182.03 |
| 5,526,482 | 6/1996 | Stallmo et al. | 395/182.04 |
| 5,546,535 | 8/1996 | Stallmo et al. | 395/182.07 |
| 5,546,558 | 8/1996 | Jacobson et al. | 395/441 |
| 5,568,629 | 10/1996 | Gentry et al. | . |
| 5,758,054 | 5/1998 | Katz et al. | 395/182.02 |
| 5,790,773 | 8/1998 | Dekoning et al. | . |
| 5,790,775 | 8/1998 | Marks et al. | 395/182.07 |
| 5,895,493 | 4/1999 | Gatica | 711/147 |

FOREIGN PATENT DOCUMENTS 9318456  9/1993  WIPO ............................. G06F 11/20

*Primary Examiner*—Albert De Cady
*Assistant Examiner*—Esaw Abraham

[57] ABSTRACT

Methods and associated apparatus within a RAID subsystem having redundant controllers define a private LUN as a data storage area known and accessible to all controllers in the system and used by them for diagnostic purposes. The methods involve sending a diagnostic write command to a first controller with instructions for it to write test data to the private LUN. This first controller writes this test data to the private LUN. A second controller, in response to another diagnostic command, then reads this test data from the private LUN and compares it to expected values provided in the diagnostic command. Using the results, it can then be determined which controller, if any, failed. If the first controller fails, then the second controller takes over ownership of portions of the data storage area assigned to the first controller. The private LUN is preferably striped across all channels used by the controllers to communicate to commonly attached disk drives. This allows the diagnostic process to test disk channel data paths in determining whether a controller has failed. The test data preferably include a data portion and a redundancy portion to enable testing of redundancy computations within the controllers. In an alternate embodiment, a host computer attached via an interface in common with the redundant controllers initiates and controls the diagnostic process to enable testing of the host/controller communication paths. Timed event messages (e.g., watchdog timer features) may be used in conjunction with other methods of the invention to further enhance failure detection.

24 Claims, 11 Drawing Sheets

METHOD #2
CONTROLLER #1

METHOD #2
CONTROLLER #2

METHOD FOR DETECTING FAILURE IN
REDUNDANT CONTROLLERS USING A
PRIVATE LUN

BACKGROUND OF THE INVENTION

1. Field of the Invention

The invention relates generally to failure detection methods operable within a computer data storage subsystem and in particular to detecting failure in redundant controllers using a shared portion of a data storage area as a private LUN for diagnostic purposes.

2. Background of the Invention

Modern mass storage subsystems continue to provide increasing storage capacity to meet user demands from host computer system applications. Due to this critical reliance on large capacity mass storage, demands for enhanced reliability are also high. Various storage device configurations and geometries are commonly applied to meet this demand for higher storage capacity while maintaining or enhancing reliability of the mass storage subsystem.

A popular choice that meets demands for increased capacity and reliability is the use of multiple smaller storage modules. These modules may be configured in geometries that permit redundancy of stored data to ensure data integrity in case of various failures. In many such redundant subsystems, recovery from many common failures can be automated within the storage subsystem itself due to the use of data redundancy, error codes, and so-called "hot spares" (extra storage modules that may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID level 2,3,4 and 5 systems, segment the data into portions for storage across several data disks. One or more additional disks are used to store error check or parity information.

RAID storage subsystems typically utilize one or more controllers that shield the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

To further improve reliability, it is generally known to use redundant controllers to reduce the failure rate of the subsystem due to control electronics failures. In some redundant architectures, pairs of controllers are configured such that they control the same physical array of disk drives. Each controller is assigned a portion of the data storage area, which it controls. The controllers may operate simultaneously using their assigned area. Upon failure of one of the controllers, the other controller can takeover operation of the area assigned to the failed controller.

Takeover is the process wherein the surviving controller logically assumes ownership of the data storage area assigned to the failed controller. These data storage areas are commonly referred to as logical units or LUNs. If the controllers share a common bus, the surviving controller may also assume the ID on the Small Computer System Interface (SCSI) bus of the failed controller so that it responds to both its original ID and the failed controller's ID.

The problem addressed by the present invention concerns how failure is detected in one or more of the controllers. It is generally known in the art to send a timed alert message from one controller to the other. This alert message may be some type of query that asks the receiving controller to send a message back indicating that it is operational. If no message is received by the controller sending the message, it assumes that the receiving controller has failed. It then proceeds to takeover operations of the receiving controller's logical units.

The problem with known failure detection methods is that they are deficient in their ability to ascertain the type of failure or where a particular failure may have occurred (e.g., in what component or data path). For example, known methods are deficient in testing processes operating within the controllers, data paths from controller to storage area, the storage area itself, and data paths between controller and host computer. The simple alert message test noted above is insufficient to determine which of the controllers actually failed or whether the data path over which the alert message and response are exchanged has failed.

In view of the above it is clear that a need exists, in data storage subsystems having redundant controllers, for an improved method of detecting failure that will more precisely diagnose where the failure may have occurred and thus how best to resolve the problem.

SUMMARY OF THE INVENTION

The present invention solves the above and other problems, and thereby advances the useful arts, by providing methods and associated apparatus for detecting failure and switching over between redundant controllers in data storage subsystems. In particular, the methods and apparatus provide for failure detection methods operable within data storage subsystems having redundant controllers. A portion of the data storage area of the subsystem is reserved for diagnostic purposes of the redundant controllers to detect failure in the redundant controllers or the data paths common to these controllers. This improves over known methods by more particularly locating where the failure has occurred and by checking additional areas of the system such as the data paths.

This reserved portion of the data storage area is referred to as a private LUN in that it is not generally accessible by standard system or application processes in attached host systems. Rather, the private LUN is used by all redundant controllers commonly attached to the private LUN for diagnosing their redundant operations. The diagnosis capability of the controllers is enhanced by including tests of the read and write data paths between the controllers and the data storage devices as well as testing the data paths between the controllers.

The private LUN is a portion of the data storage area that is known and accessible to controllers in the system and can be used by them for diagnostic purposes consistent the RAID management levels supported by the controllers (e.g., including RAID parity testing). In this respect it is unlike other portions of the data storage area that are assigned to each controller and used for persistent data storage. The private LUN may be of any size, but is preferably defined as a striped unit accessing at least one storage device on each storage device interface channel in the subsystem. The private LUN is dynamically mapped such that the number of drives in the private LUN is dynamically changed when a device fails. For example, in a storage subsystem with five disk drives, when drive #2 fails, the mapping of the private LUN is "down sized" from a 4+1 array device to a 3+1 LUN. When drive #2 is repaired or if new drives are marked on line, the mapping of the private LUN dynamically grows to include these drives as they are made operational (i.e., included in a logical unit definition).

In general, the methods of the present invention involve sending a diagnostic write command to a first controller with instructions for it to write test data to the private LUN. This first controller writes this test data to the private LUN. A second controller then reads this test data from the private LUN. Meanwhile, an original copy of the test data is sent to the second controller by other means. The second controller compares the read back test data to the value of the original test data before being written to the private LUN. Using the results, it can be determined if the first controller failed, the second controller failed or neither controller failed.

Each controller of the redundant controllers may be assigned primary responsibility for particular LUNs (data LUNs other than the private LUN) as well as redundant or secondary responsibility for certain data LUNs. If the first controller fails, the second controller takes over ownership of portions of the data LUNs assigned to the first controller. The takeover is automatic in the sense that the switch over occurs within the controllers in the data storage subsystem without external control.

In a first embodiment of the present invention, the diagnosis and takeover processing using the private LUN is initiated by the controllers. No host computer need be involved or aware that failure has occurred depending upon host and controller interconnection topologies. A diagnostic write command is sent from a first controller to a second controller via a shared communication path. The diagnostic write command includes instructions for the second controller to write test data to the private LUN. The second controller writes the test data to the private LUN. The first controller reads the test data from the private LUN. This read-back test data may or may not have the is same value as the original test data. The first controller then compares the read-back test data to the original test data. The results of this comparing step are used to determine which controller, if any, has failed. If neither controller failed, then the failure detection method is repeated after a certain time interval. If the second controller failed, then the first controller takes over ownership of the portion of the data storage area previously assigned to the second controller. If the first controller (which did the comparing) fails, then the method stops within the first controller due to its failure.

The method is repeated and is symmetrical. That is, the above method initiated by the first controller, to test the second controller, may likewise be initiated by the second controller, to test the first controller. This may then result in the second controller taking over LUNs owned by the first controller. For each particular pair of diagnosing controllers, the private LUN may define a unique "storage area" within dedicated to that diagnosing, redundant pair. The symmetric diagnostic process within that pair or other pairs will use their respective designated unique areas of the private LUN.

The comparing process noted above includes several steps. The test data as written to the private LUN comprises a main data portion and a redundancy data portion. The comparing step includes comparing the main data portion of the read-back test data to the original test data. If they are not the same, then it is presumed that the second controller has failed. If they are the same, then further steps are performed. A first means is used to calculate additional redundancy data from the main portion of the read-back data (e.g., a parity assist circuit on the controller). This additional redundancy data is then compared to the redundancy data portion of the test data read from the private LUN. If they are the same, it is concluded that neither controller failed. If they are not the same, then a second means of the first controller (e.g., software means within the controller) is used to calculate further additional redundancy data from the main portion of the read-back test data. This further additional redundancy data is likewise compared to the redundancy data portion of the test data read from the private LUN. If they are not the same, then it is confirmed that the second controller failed. As noted above in case of such failure, the first controller takes over LUNs owned by the second controller. If they are the same, then it is presumed that the first controller has failed due to failure of its first means for computing redundancy data and the method terminates within the first controller.

In a second embodiment of the present invention, one or more host computers are involved in the diagnosis. This method has the further advantage that data paths between host computers and controllers are diagnosed. In this second method, a host computer sends a diagnostic write command to a first controller. The diagnostic write command carries instructions for the first controller to write test data to the private LUN. The host also sends this test data to a second controller. The second controller stores the host supplied test data in a first buffer. The first controller writes the test data to the private LUN. The second controller then reads the test data from the private LUN and stores it in a second buffer. The second controller then compares the test data received from the host computer to the test data read from the private LUN. This comparing step is substantially as described above.

An enhancement to the second method can diagnose failures in the host/controller communication path. After the first controller receives a diagnostic write command from the host, it starts a timer. If the first controller has not received a new diagnostic write command from the host in a designated time period, it sends an alert message to the second controller indicating that the host has not been heard from. The second controller, upon receiving this alert message will determine if it has received a diagnostic write command from the host within the designated period. If it has, it will invoke a takeover of the first controller's LUNs because it assumes that the host and first controller have lost communication ability. If the second controller has not received a diagnostic write command from the host during the specified period, it will ignore the alert message.

It is therefore an object of the present invention to provide methods and associated apparatus for detecting failure in storage subsystems having a plurality of controllers communicating through a private LUN.

It is a further object of the present invention to provide methods and associated apparatus for detecting failure in storage subsystems having redundant controllers wherein a first controller write test data to a private LUN and a second controller reads the test data from the private LUN to determine whether a failure has occurred.

It is still a further object of the invention to provide methods and associated apparatus for detecting failure in storage subsystems having redundant controllers wherein a host computer communicates test data to the redundant controllers for diagnosis tests using a private LUN.

It is yet a further object of the invention to provide methods and associated apparatus for detecting failure in storage subsystems having redundant controllers wherein a host computer communicates test data to the redundant controllers and wherein a first of the redundant controllers writes the test data to a private LUN and a second controller reads the test data from the private LUN to determine whether a failure has occurred.

The above and other objects, aspects, features, and advantages of the present invention will become apparent from the following description and the attached drawings.

DETAILED DESCRIPTION OF THE PREFERRED EMBODIMENTS

Figure 1:
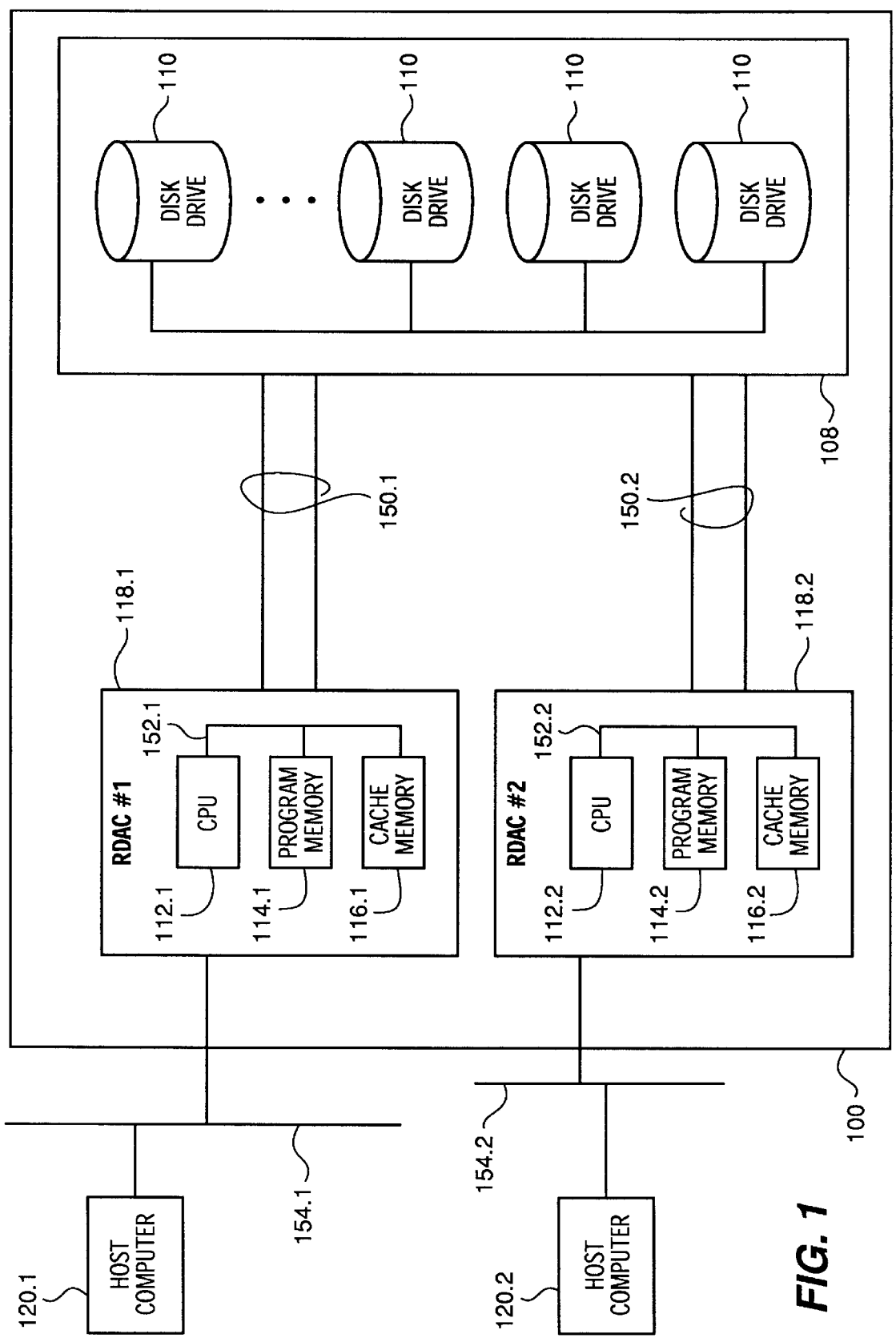
FIG. 1 is a block diagram of a typical RAID storage subsystem in which the structures and methods of the present invention may be applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Raid Overview:

FIG. 1 is a block diagram of a typical RAID storage subsystem 100, having redundant disk array controllers 118.1 and 118.2 (hereinafter referred to as RDACs), in which the methods and associated apparatus of the present invention may be applied. RAID storage subsystem 100 includes at least one pair of RDACs 118.1 and 118.2. Each RDAC 118.1 and 118.2 is in turn connected to disk array 108 via buses 150.1 and 150.2, respectively, and to host computers 120.1 and 120.2 via buses 154.1 and 154.2, respectively. Disk array 108 is composed of a plurality of disk drives 110. One of ordinary skill in the art will readily recognize that interface buses 150.1 and 150.2 between RDACs 118.1 and 118.2, respectively, and disk array 108 (including disk drives 110) may each be comprised of a plurality of buses and may be any of several industry standard interface buses including SCSI, IDE, EIDE, IPI, Fiber Channel, SSA, PCI, etc. Circuits (not shown) within RDACs 118.1 and 118.2 appropriate to controlling buses 150.1 and 150.2, respectively are well known to those of ordinary skill in the art. Interface buses 154.1 and 154.2 between RDACs 118.1 and 118.2 and host computers 120.1 and 120.2, respectively, may be any of several standard industry interface buses including SCSI, Fibre Channel, Ethernet (LAN), Token Ring (LAN), etc. Circuits (not shown) within RDACs 118.1 and 118.2 appropriate to controlling bus 154.1 and 154.2, respectively, are well known to those of ordinary skill in the art. Further, those skilled in the art will readily recognize that the methods of the present invention may operate within any number of redundant controller. The pair of RDACs 118.1 and 118.2 shown in FIG. 1 are therefore intended as suggestive of any plurality of redundant controllers.

As shown in FIG. 1, RAID storage subsystem 100 may be utilized to implement any of the well-known RAID levels (e.g., levels 0–5). The various RAID levels are distinguished by the manner in which the associated RAID controllers logically subdivides or partitions the disk drives 110 in disk array 108. For example, when implementing RAID level 1 features, approximately half of the disk drives 110 of disk array 108 are used to store and retrieve data while the other half is operated by the RAID controller to mirror the data storage contents of the first half. Further, when implementing RAID level 4 features, the RAID controller utilizes a portion of the disk drives 110 in disk array 108 for the storage of data and the remaining disk drives 110 are utilized for the storage of redundancy data such as error checking/correcting information (e.g., parity information). As discussed below, the methods and associated apparatus of the present invention may be applied to the RAID storage subsystem 100 in conjunction with any of the standard RAID levels.

RDAC 118.1 includes CPU 112.1, program memory 114.1 (e.g., ROM/RAM devices for storing program instructions and variables for the operation of CPU 112.1), and cache memory 116.1 for storing data and control information related to the data stored in disk array 108. CPU 112.1, program memory 114.1, and cache memory 116.1 are connected via memory bus 152.1 to enable CPU 112.1 to store and retrieve information in the memory devices. RDAC 118.2 is identical to RDAC 118.1 and is comprised of CPU 112.2, program memory 114.2 and cache memory 116.2, all interconnected via memory bus 152.2. The RDACs 118.1 and 118.2 are preferably interchangeable devices within RAID subsystem 100 to permit easy replacement, including hot swap, of a defective RDAC. One of ordinary skill in the art will readily recognize that the block diagram of FIG. 1 is intended only as an exemplary design that may embody the methods and structures of the present invention. Many alternative controller and subsystem designs may embody the methods and associated apparatus and structures of the present invention.

As is known in the art, a RAID subsystem may subdivide or partition the disk drives 110 of disk array 108 to define a plurality of logical units (data LUNs) for storage of host system data. In a redundant controller environment such as that of FIG. 1, each data LUN is associated with a primary controller (e.g., RDAC 118.1 or 118.2). Other controllers serve as a redundant or secondary controller for that data LUN in a passive operating or standby mode with respect to that data LUN. Those redundant controllers may be primary controllers for others of the plurality of data LUNs.

The redundant controllers stand prepared to takeover operations on behalf of the primary controller when they sense a failure in the operation of the primary controller. The redundant controller effectuate a takeover by assuming primary control responsibilities for the data LUNs associated with the failed primary controller. The redundant controllers therefore include methods to sense a failure in operation of the primary controller so as to initiate takeover processing.

The present invention addresses problems in this need to sense a failure in the operation of another controller. The present invention provides for methods and associated apparatus to reserve a portion of the storage area of disk array 108 as a private LUN. As noted above, the private LUN is one, unlike the data LUNs, which is not accessible for storage and retrieval of data except diagnostic data in accordance with the present invention. Rather, the private LUN is reserved for access by the redundant controllers for diagnosis of the operation of other controllers commonly attached to the private LUN. In general, the methods and apparatus of the present invention provide for writing of test data in the private LUN by a first of the redundant controllers and reading of that test data from the private LUN by a second of the redundant controllers. By performing various comparisons on the data read back from the private LUN, the second controller may more accurately determine the nature and source of a failure as compared to prior techniques.

In a first embodiment of the present invention, methods of the present invention are operable within the redundant controllers of the RAID subsystem, devoid of interaction with attached host computers. The redundant controllers communicate amongst one another to effectuate the diagnostic sequences involving the private LUN for purposes of identifying a failure of one of the redundant controllers. As noted above, depending upon the host/RAID interconnection topologies, the diagnostic commands may be issued over paths between the controllers used for host communication (e.g., common host channels) or other paths used for disk drive communication (e.g., common disk channels).

In a second embodiment, wherein the redundant controllers share a common communication path with one or more host computers, the methods are modified to include host interaction in the diagnostic processes. This second embodiment enables more thorough testing of the redundant controllers by permitting testing of the common communication path using the host computer. Those skilled in the art will recognize a wide variety of communication topologies wherein multiple controllers may communicate with common host computers. A particular exemplary embodiment is described herein where multiple controllers share a single common connection with a single common host system. As noted a variety of equivalent configurations may be envisioned wherein a single host system may communicate with multiple controllers. The multiple controllers need not necessarily reside on a common communication path with one another for application of this second embodiment.

Both embodiments may be further enhanced by adding timed messaging features which, as known in the art, allow for identification of still other failure modes.

Bus Configurations

Figure 2:
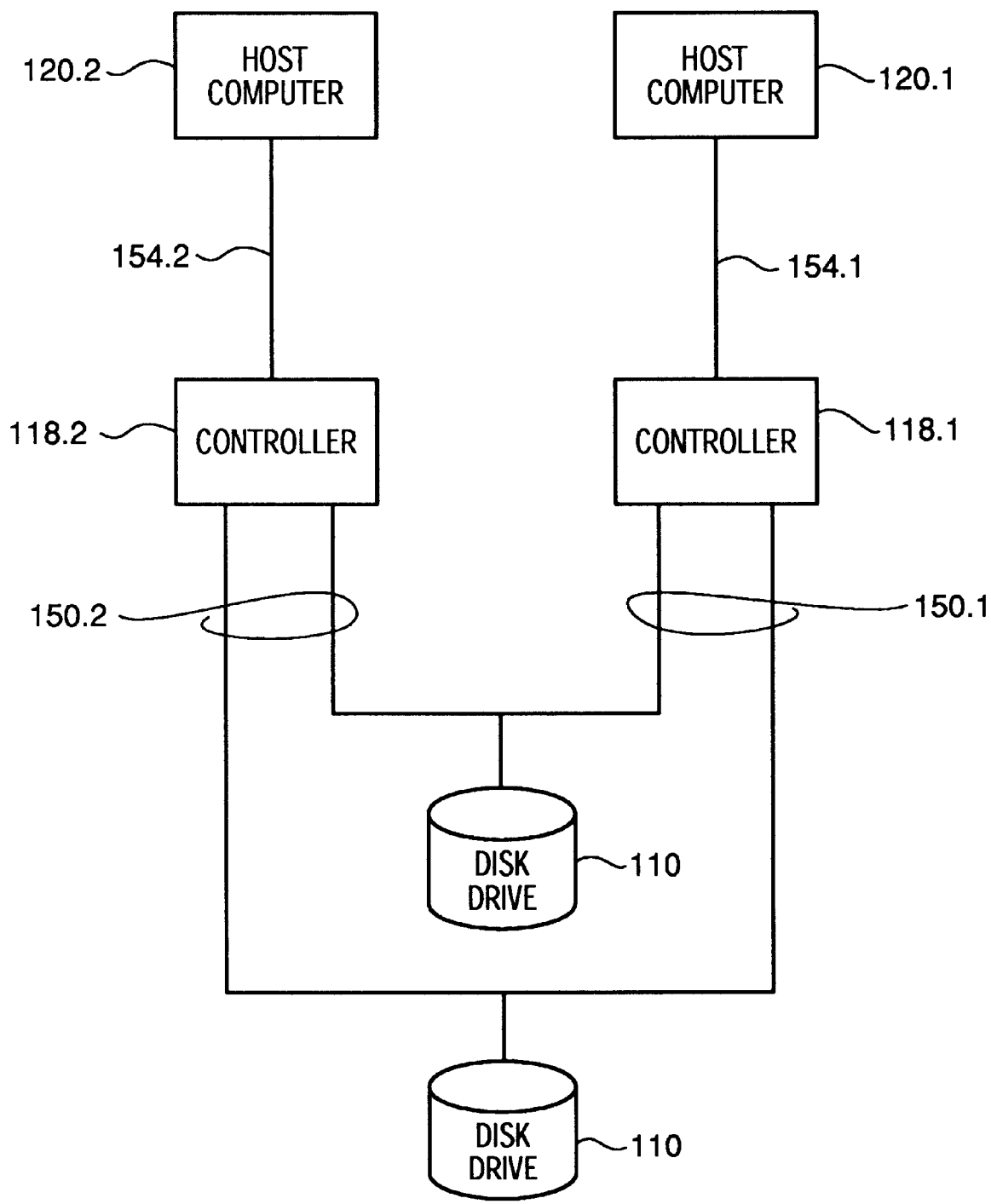
FIG. 2 is a block diagram of a split-bus configuration in which redundant controllers as in FIG. 1 do not share a common communication path connecting each to host computers.

FIG. 2 is a simplified view of FIG. 1 illustrating a split-bus configuration. Buses 154.1 and 154.2 directly connect host computers 120.1 and 120.2 with controllers 118.1 and 118.2, respectively. In the split-bus configuration a host computer 120.1 cannot directly communicate with other controllers in the system (e.g., 118.2). Rather, each host system 120.1 and 120.2 has direct access only to one of the two controllers, 118.1 and 118.2, respectively. FIG. 2 further shows separate buses 150.1 and 150.2 connected to each disk drive 110. As will become apparent, the failure detection methods of the invention can be used to test each of the plurality of these buses 150.1 and 150.2. Each bus 150.1 and 150.2 is herein also referred to as a channel. In the split-bus configuration, the redundant controllers 118.1 and 118.2 can communicate with one another via the disk channels (150.1 and 150.2). Those skilled in the art will further recognize that, though not shown in FIGS. 1–3, redundant controller may also share a dedicated communication channel dedicated to communication of information and diagnostics amongst the redundant controllers. For example, such a dedicated channel might include a serial communication channel, LAN communications, SCSI, Fibre Channel, etc. The methods of the present invention as applied in the split bus configuration require merely that the redundant controllers share some communication channel useful for exchange of diagnostic requests and data.

Figure 3:
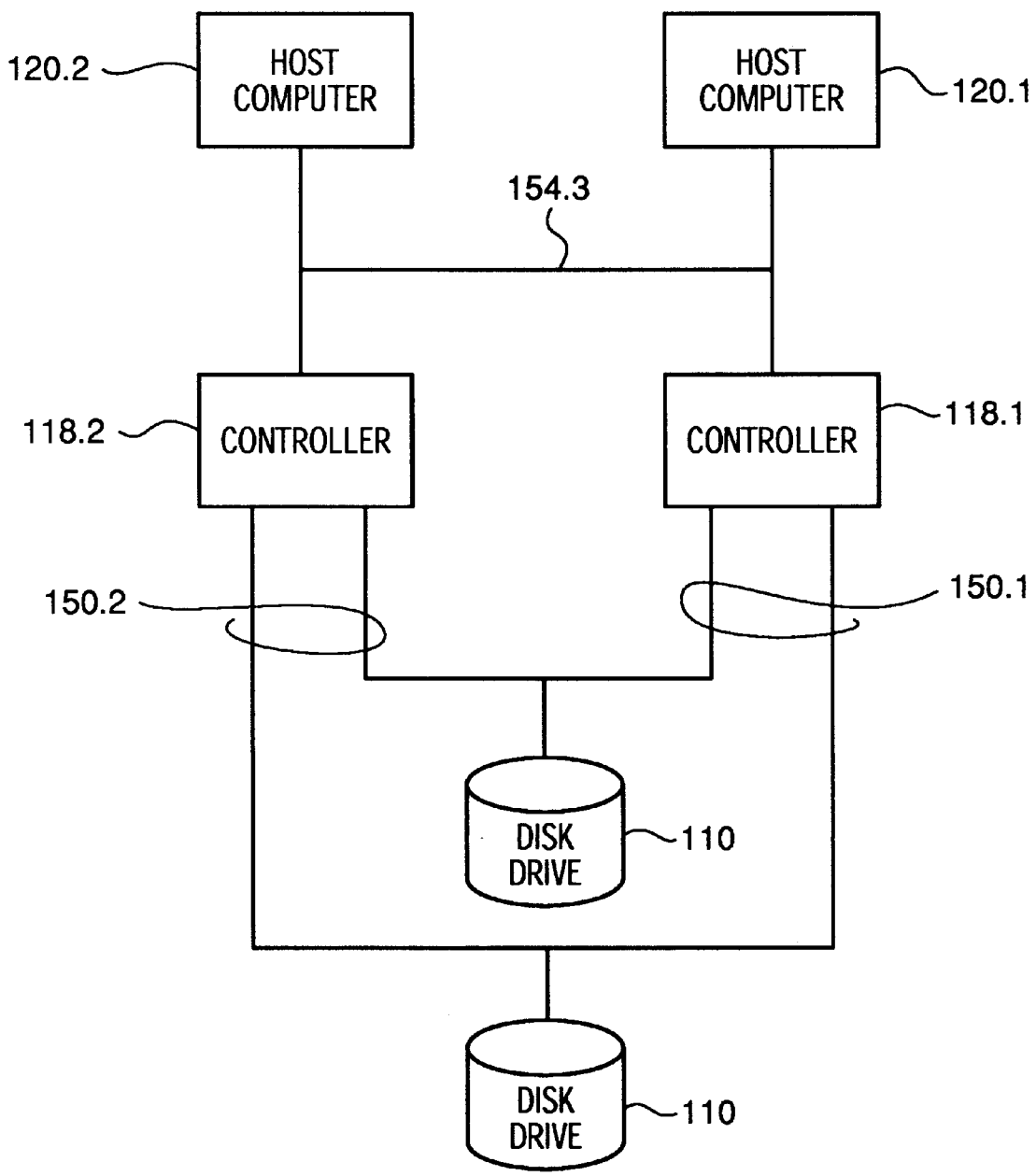
FIG. 3 is a block diagram of a shared-bus configuration in which redundant controllers as in FIG. 1 share a common communication path connecting each to host computers and to one another.

FIG. 3 shows what is hereinafter referred to as a shared-bus configuration. FIG. 3 is the same as FIGS. 1 and 2 except that shared-bus 154.3 is used, instead of split buses 154.1 and 154.2. Bus 154.3 interconnects host computers 120.1 and 120.2 and controllers 118.1 and 118.2. This interconnection, as will be seen, makes the shared-bus configuration appropriate for the second embodiment of the invention wherein a host computer initiates the failure detection method by sending a diagnostic write command to two controllers. This second embodiment therefore enables more thorough testing of the operation of the redundant controller. The controllers' communications with a host computer are also tested by the methods and structures of the second embodiment of the invention.

Those skilled in the art will recognize a variety of interconnection topologies between host computers and RAID controllers in which the methods and associated apparatus of the present invention may be advantageously applied. For example, one or more host systems may have redundant connections to one or more RAID controllers. Or, for example, one or more RAID controllers may provide redundant connection paths to one or more host systems. Such host systems may have multipath management subsystems within (e.g., dual ported Fibre Channel connections between host systems and storage subsystems). Takeover processing and associated notification of detected failures may therefore include various combinations of host system and RAID controller involvement.

The exemplary embodiment of FIG. 3 is intended to represent any such topologies or configurations where a one (or more) host systems may communicate with each of a redundant multiplicity of controllers. The host system and controllers may or may not physically share a single common communication path. However, the shared bus configuration represented in FIG. 3 is intended to represent any configuration where at least one host system may communicate with each of a redundant multiplicity of controllers.

First Embodiment: Controller Initiated

Figure 4:
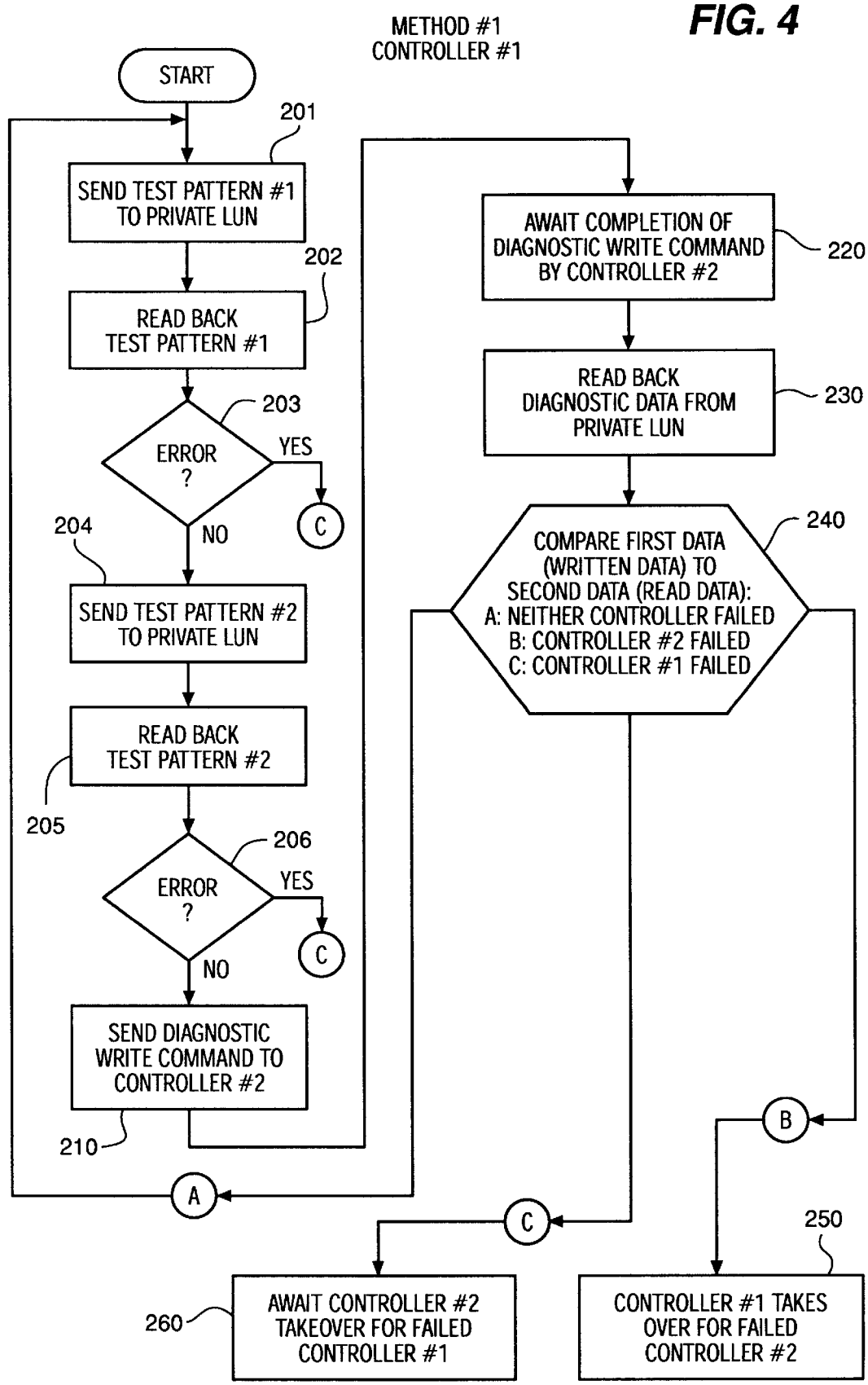
FIG. 4 is a flowchart describing the operation of the first controller in accordance with a first embodiment of the invention.

FIG. 4 is a flowchart describing a first method of the present invention operable within a first controller to initiate the failure detection method of the invention. The first controller may be RDAC 118.1 in FIGS. 1–3, for example. However the method may be simultaneously initiated by RDAC 118.2 as the first controller. In other words, the methods of the present invention are symmetric and operable among all redundant controllers to test other redundant controllers.

Elements 201–206 verify operation of the first controller 118.1 prior initiating the diagnostic sequence to the second controller 118.2. In particular, element 201 is operable to write a first test pattern of data on a private LUN common to both controllers. The private LUN is preferably striped across all disk drives 110 in disk array 108 so as to effectuate a test of all disk channels 150.1 and 150.2 associated with both controllers. Element 202 reads back from the private LUN the data just written thereto. If element 203 determines that there is an error in writing the test pattern data or in reading the information back, it is determined that the first controller 118.1 has failed and the method continues at element 260 (label C) by awaiting takeover by the second controller. Otherwise, elements 204–206 repeat the same sequence, writing test data, reading it back, and sensing any errors, but with a second test pattern of data. In addition to testing operation of the first controller 118.1 with respect to the private LUN, elements 201–206 also serve to assure that any old data previously written to the private LUN is overwritten. Thus, old data will not be confused in a manner to defeat the testing of the controllers via the private LUN. If elements 201–206 determine that the first controller 118.1 is properly functional with respect to access to the private LUN, processing continue with element 210.

Element 210 is operable to send a diagnostic write command from the first controller 118.1 to a second controller 118.2. The diagnostic write command comprises instructions for the second controller to write first test data to the private LUN. Element 220 shows the first controller awaiting action by the second controller to write the first test data to the private LUN. Following completion of the private LUN write by the second controllers, element 230 shows reading of the test data from the private LUN by the first controller. The first controller reads the entire stripe of test data the second controller has written. The read test data is merely the value of the test data after it has been written to the private LUN by the second controller and read back by the first controller. The value of the read test data may or may not be the same as that of the original test data. Differences in comparing the read and original test data may reveal particular failures of one of the redundant controllers.

Element 240 shows comparing of the read test data to the original test data within the first controller. The results are used to determine which controller, if any, has failed. Label A in element 240 indicates the condition in which neither controller failed. The method loops back to START at element 210 and is continuously repeated (preferably after a time delay).

Label B out of element 240 indicates the condition in which the second controller has failed. The second controller is the controller that was sent the diagnostic write command by the first controller. This condition continues execution of the method by jumping to element 250 to initiate takeover processing. The first controller takes over ownership of those portions of the data storage area assigned to the second controller.

Label C out of element 240 indicates the condition in which the first controller has failed. The first controller is the controller performing the comparing. If the first controller fails, the method terminates in the first controller and the first controller becomes passive until appropriate repairs are enacted. The details of the comparing step are further explained below in reference to FIG. 6.

Figure 5:
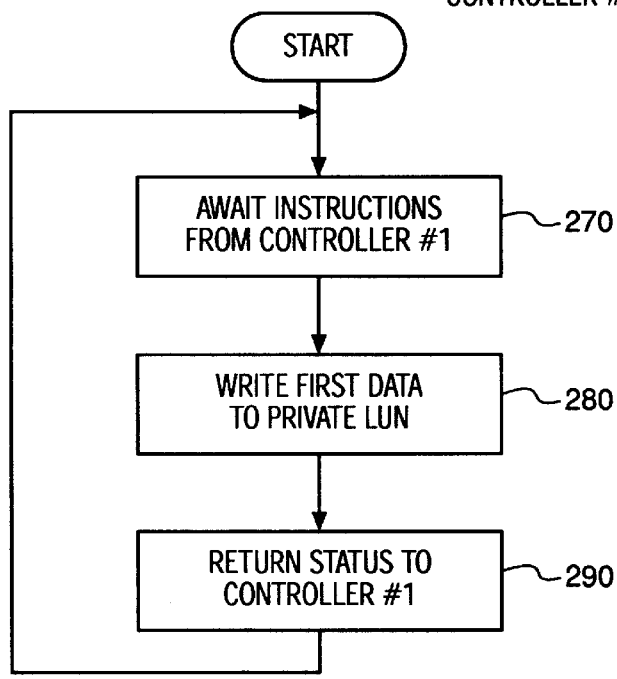
FIG. 5 is a flowchart describing the operation of the second controller in accordance with a first embodiment of the invention.

FIG. 5 shows a method of the first embodiment of the invention operable within the second controller. The second controller may be RDAC 118.2, for example, if the first controller is RDAC 118.1 and vice versa. Element 270 shows the second controller awaiting diagnostic command instructions from the first controller. Namely, the second controller is awaiting diagnostic write command 210 from the first controller. After a receiving a diagnostic write command, the method continues with element 280 representing the second controller writing test data to the private LUN. The test data is supplied with the diagnostic write command from the first controller. The method continues with element 290 wherein the second controller returns status to the first controller indicating that the supplied test data has been written to the private LUN. After completing element 290, the method loops back to START at element 270 and again awaits instructions from the first controller.

Figure 6:
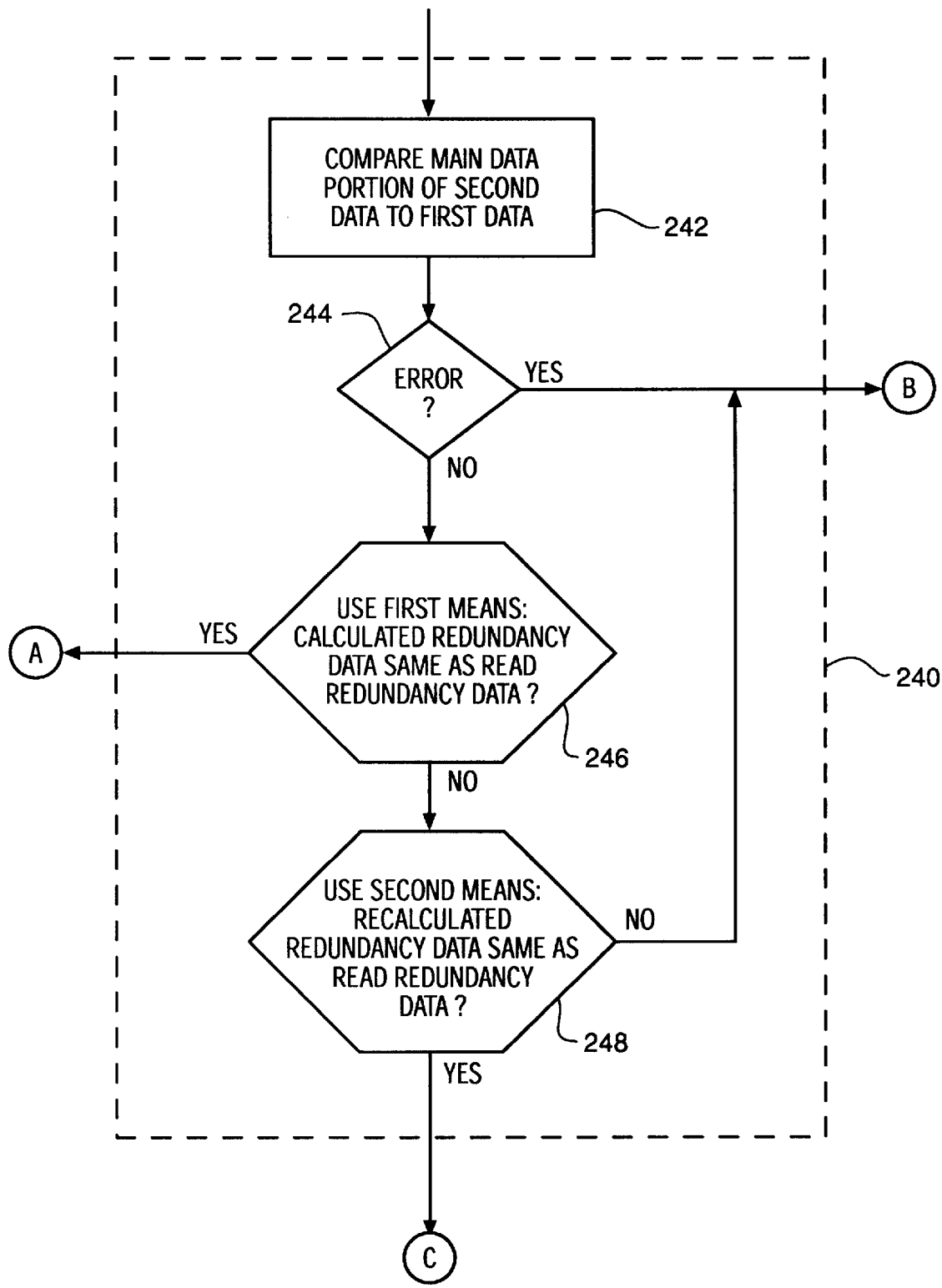
FIG. 6 is a flowchart describing additional detail of the comparing step of FIG. 4.

FIG. 6 shows the comparing process of element 240 of FIG. 4 in more detail. Similar comparison element is operable in a second embodiment of the invention discussed below. FIG. 6 is therefore a detailed view of element 240 of both FIG. 4 (portion of a first embodiment) and FIG. 10 (portion of a second embodiment). The labeled paths A, B and C in FIG. 6 correspond to those in FIG. 4 and FIG. 10. In both the first and second methods, element 240 is operable in the controller that is performing the comparison of test data as originally provided and as read back from the private LUN after being written thereto. The test data written to the private LUN comprises a main data portion and a redundancy data portion. The redundancy data portion may be parity data calculated from the main data portion by an XOR operation as is common in RAID techniques.

Element 242 in FIG. 6 shows comparing the main data portion of the test data that has been read from the private LUN to the value of the test data before it was sent to the private LUN. The method continues with decision element 244. If the read-back main test data is not the same as the as the original test data, then an error has occurred and processing continues at label B representing takeover by the controller performing the comparison of the data LUNs assigned to the other controller. It is presumed that there is some type of problem in the other controller's ability to accurately store data in the private LUN. If the read-back test data is the same as the original data, then no error has occurred at this point and processing continues at element 246 to diagnose the redundancy portion of the test data. Element 246 represents an operation within the controller doing the comparing of using a first means (e.g., parity assist circuits) to calculate redundancy data from the main portion of the test data which has been read from the private LUN. The redundancy values so calculated are compared to the redundancy data portion of the test data read from the private LUN. If they are the same, then it is presumed that the redundancy generating means in the controller is operating correctly and processing continues at label A. If they are not the same, then the method continues at element 248 wherein a second means (e.g., software computation) is used to recalculate redundancy data from the main portion of the test data read from the private LUN. These second calculated redundancy values are compared to the redundancy data portion of the test data read from the private LUN. If again they are not the same, then it is confirmed that there is not a problem with the first redundancy data calculating means. The error is presumed to be with the other controller and processing continues at label B to initiate takeover processing from the other controller. If the values are the same as determined by element 248, then it is presumed that the problem is with the redundancy data generating means of the controller doing the comparison. The method terminates in the controller doing the comparison as indicated at label C. The controller performing the comparison is presumed to have a faulty parity computation means (e.g., a faulty parity assist circuit).

Figure 7:
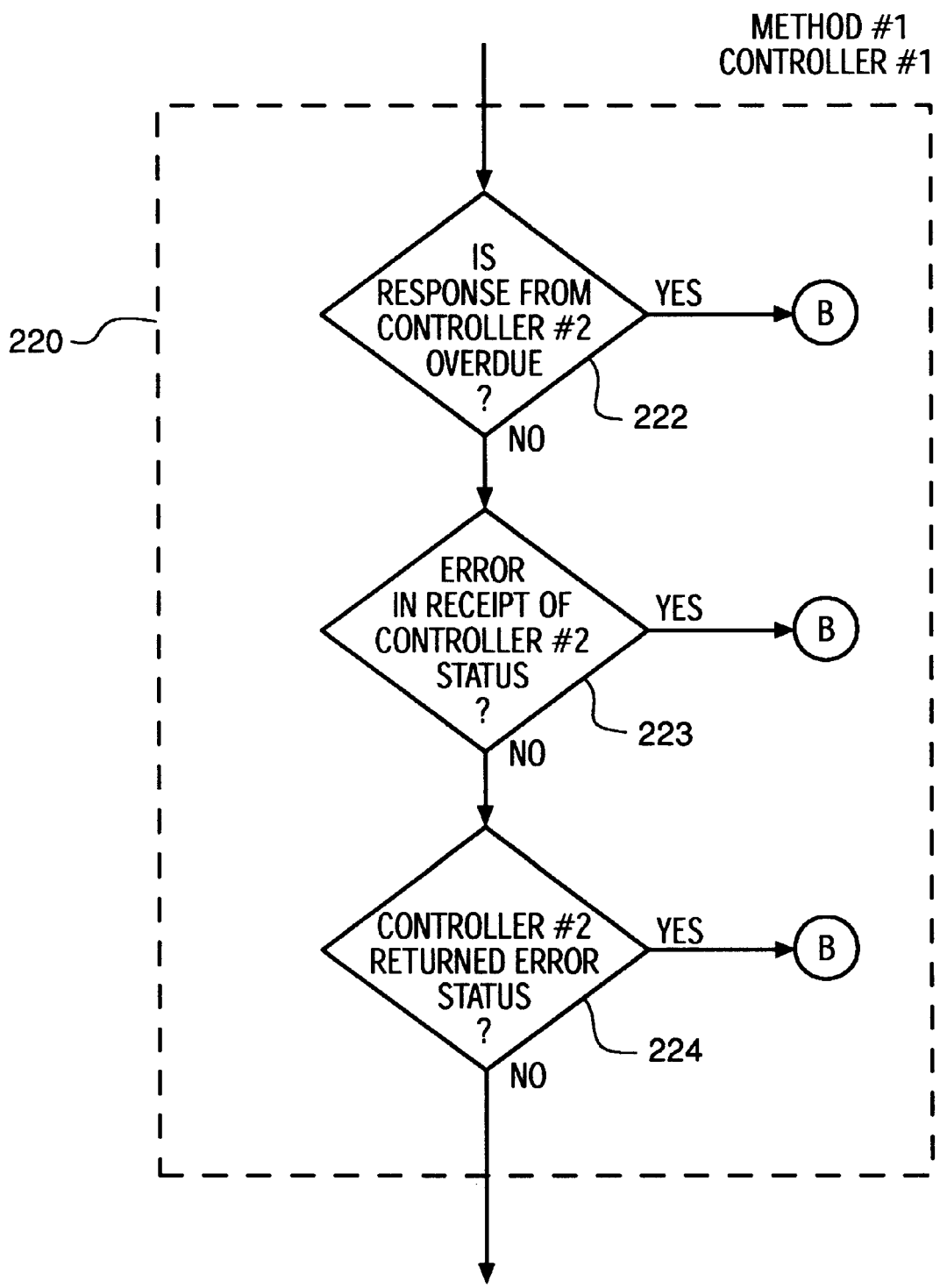
FIG. 7 is a flowchart describing in greater detail an timing element in the operation of the first controller in FIG. 4.

FIG. 7 is a detailed description of the processing of element 220 in FIG. 4. Element 220 represents a timed failure test operable in the first controller. After sending a diagnostic write command to the second controller, the first controller starts a timer. Element 222 in FIG. 7 represents a decision wherein a response is due within a predetermined timeout from the second controller. If no response is received, then it is presumed that the second controller has failed. The first controller takes over data LUNs assigned to the second controller and processing continues at label B of FIG. 4. If time has not run out, the other possibility is that there may be some error in receiving a response from the second controller. If the response is not yet overdue, (i.e., not yet timed out), then processing continues with element 223 to determine whether an invalid or unexpected status is returned. The requisite response may have been received but not in the expected form (e.g., a corrupted or otherwise erroneous version thereof). If such an erroneous response was detected, then it is presumed that the second controller has failed. The first controller takes over data LUNs assigned to the second controller and processing continues at label B of FIG. 4. If there is no error in receiving a response from the second controller, then the method continues at element 224 to determine whether the second controller returned a failure status. The second controller may return such a status if it senses that it is unable to complete the requested diagnostic write command for any of several reasons. If such an error is detected, processing continues at label B of FIG. 4. If an appropriate response is received from the second controller and no error status is indicated, processing continues with element 230 shown in FIG. 4.

Those skilled in the art will recognize that the determination that the second controller has failed by elements 222 and 223 above is largely heuristic in nature. It is unclear which, if either, controller is the cause of the problem. However, since the first controller has already determined that it is properly operational (as in FIG. 4 above), it makes the presumption that the second controller is the cause of the problems and takes over processing therefor.

Second Embodiment: Host Assisted

In a second embodiment of the invention, operable in a shared-bus configuration as noted above with respect to FIG. 3, a host computer is involved in the failure detection method. This second embodiment has the further advantage that the diagnostic processing tests the data paths between one or more host computers and the redundant controllers. This second embodiment is operable within the configuration shown in FIG. 3 wherein a common bus 154.3 is used between a host computer (e.g., 120.1 and/or 120.2) and controllers 118.1 and 118.2.

Figure 8:
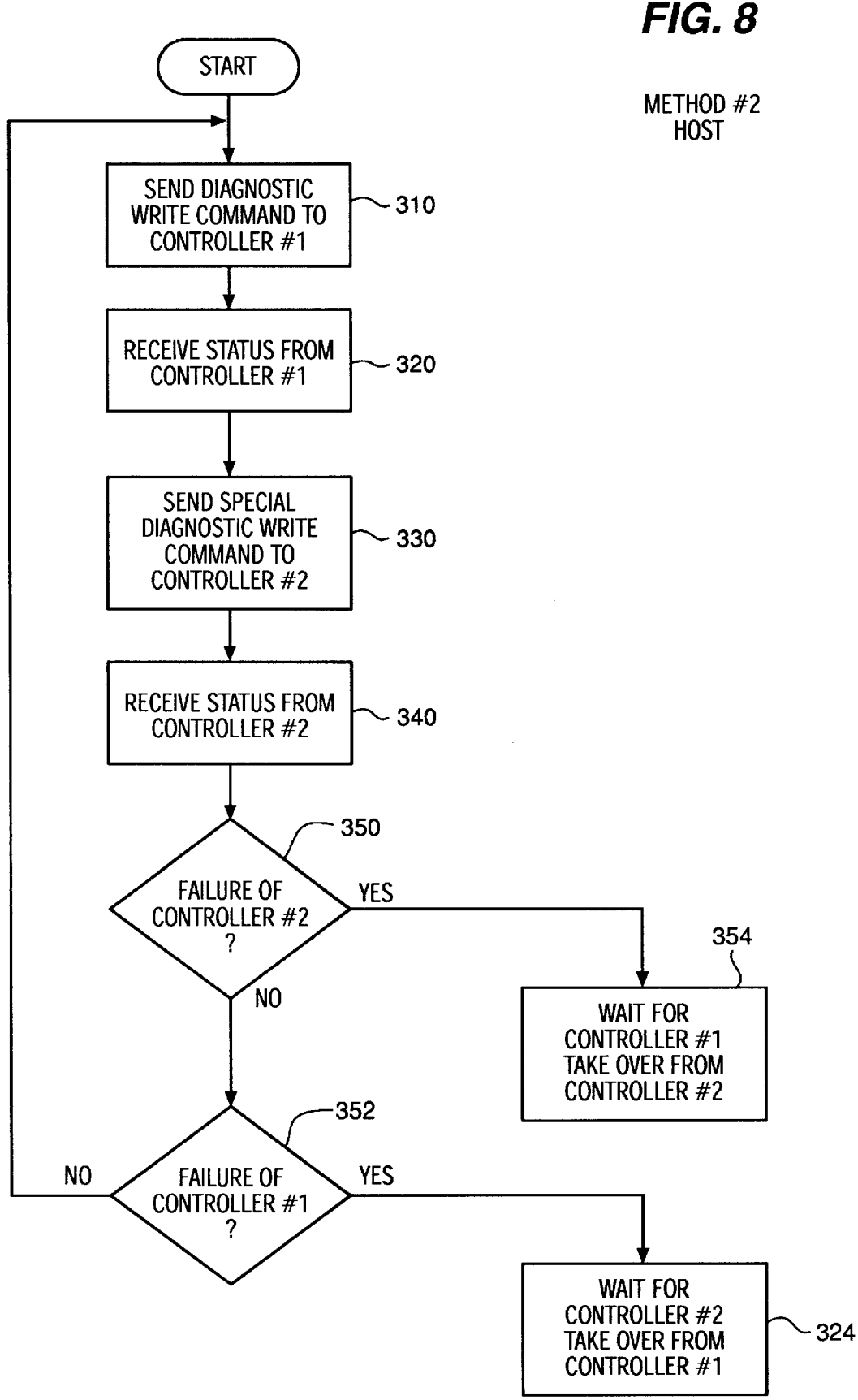
FIG. 8 is a flowchart describing the operation of a host computer in accordance with a second embodiment of the invention.

FIG. 8 is a flowchart describing a method of the present invention operable within a host computer 120.1 of FIG. 3 to initiate and coordinate control of the diagnostic process in accordance with the second embodiment of the invention. As noted above with respect to the first embodiment, a symmetrical method could be simultaneously initiated by another host computer 120.2 reversing the roles of the first and second controllers as described below. Alternatively, a single host computer 120.1 may initiate the diagnostic processes reversing the roles of the first and second controllers as described below. Those skilled in the art will recognize several such variants of the methods described herein within the scope of the invention which use a private LUN to enable more thorough evaluation of the operability of redundant controller.

Element 310 of FIG. 8 is first operable to send a diagnostic write command from a host computer 120.1 to a first controller 118.1 of the redundant controllers. As in the first embodiment described above, the diagnostic write command contains instructions for the first controller to write host supplied test data to the private LUN. The method continues with element 320 in which a status is received by the host computer from the first controller indicating whether the diagnostic test completed writing to the private LUN. A determination of the success or failure of the diagnostic test of the first controller will be performed by completing the test procedure with the second controller. In other words, the second controller will determine whether the writing operation of the first controller was a success or a failure. Processing then continues with element 330.

Element 330 shows that a similar special diagnostic write command is sent to a second controller 118.2 of the redundant controllers. Element 330 provides the second controller with the same test data as sent to the first controller and presumed correctly written to the private LUN. The special diagnostic write command to the second controller 118.2 is special in that it includes an identification that the test data supplied is not to be written to the private LUN as with the first controller. Rather, the supplied test data in the special diagnostic write command to the second controller 118.2 is used for comparison with the test data to be read from the private LUN. Element 340 shows that a status is received by the host from the second controller indicating that it has performed the special diagnostic write command and determined whether the first controller failed, second controller failed, or neither controller failed.

Element 350 determines whether the returned status from the second controller 118.2 indicates that the second controller 118.2 has failed. If so, processing continues with element 354 to await the expected takeover by the first controller 11 8.1 of the data LUNs controlled by the failed second controller 18.2. If the second controller 118.2 has not failed as determined by element 350, processing continue with element 352. Element 352 determines whether the returned status from the second controller 118.2 indicates that the first controller 118.1 has failed. If so indicated, processing continues with element 324, as above, to await the expected takeover by the second controller 118.2 of data LUNs controlled by the failed first controller 118.1. If neither controller is sensed to have failed by operation of elements 350 and 352, processing continues by looping back to element 310 to repeat the method (following a suitable delay period).

Figure 9:
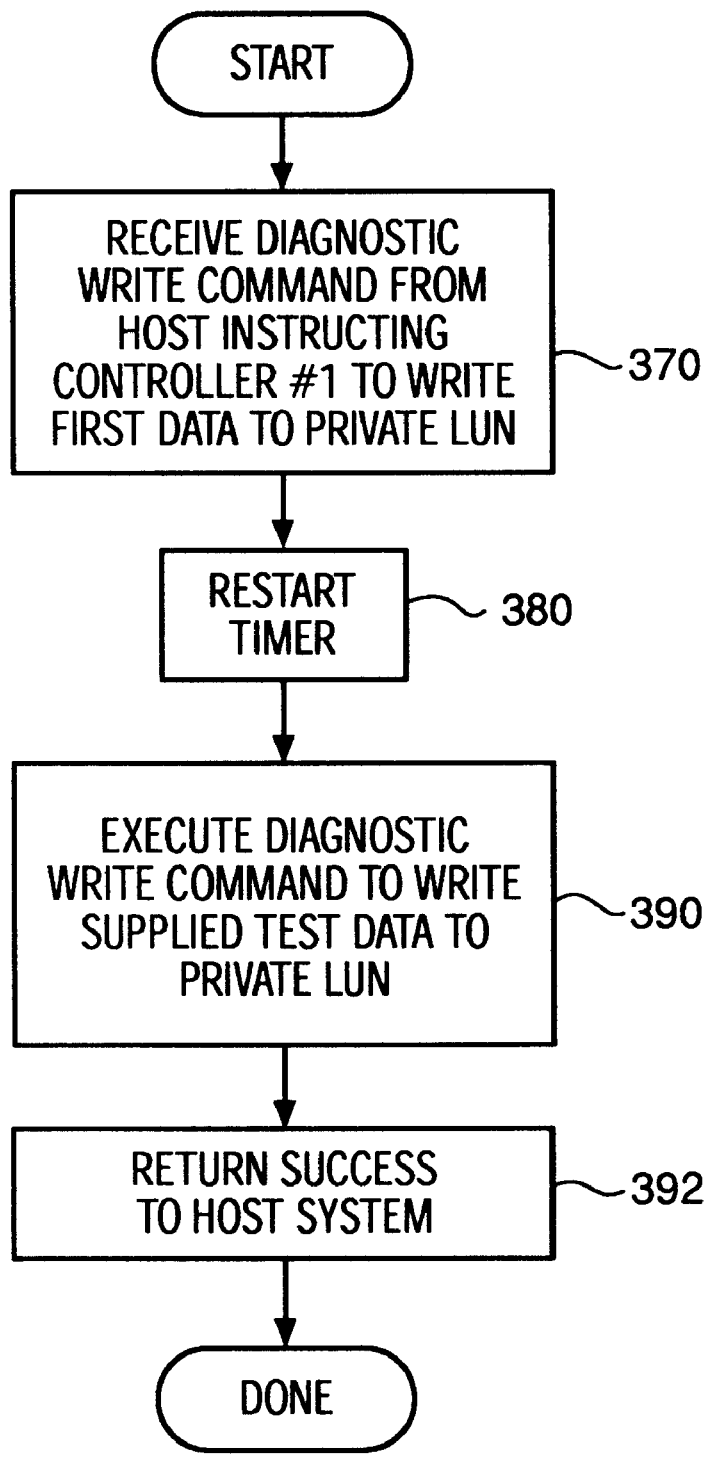
FIG. 9 is a flowchart describing the operation of the first controller in accordance with a second embodiment of the invention.

FIG. 9 shows a method of the second embodiment which is cooperable within a first controller 118.1. Element 370 indicates a diagnostic write command is received from the host computer. Element 380 indicates that a timer is restarted. Details of the timer option are discussed below with reference to FIGS. 11 and 12. This timer marks a specified time starting from the moment a diagnostic write command is received by the first controller 118.1. This enables the first controller 118.1 to determine if there is a problem in receiving diagnostic write commands from the host computer. Element 390 next indicates that the first controller 118.1 executes the diagnostic write command by writing the host supplied test data to the private LUN. The first controller 118.1 then sends a message to the host computer indicating status of completion of the diagnostic write command within the first controller 118.1. Those skilled in the art will recognize that various error conditions may be recognized within the method depicted in FIG. 9. Such error conditions (not shown) may include, for example, receipt of erroneous test data as indicated by an improper redundancy portion as compared to the supplied test data. The first controller 118.1 may, for example, check the redundancy portion of the test data by computing an expected redundancy value for the main data portion by any or all of multiple redundancy computation means. As noted above with respect to elements 246 and 248, multiple means for such redundancy computations may be used to determine whether such a failure likely lies in the host/controller communication path or in the controller redundancy assist circuits (e.g., XOR parity assist circuits).

Figure 10:
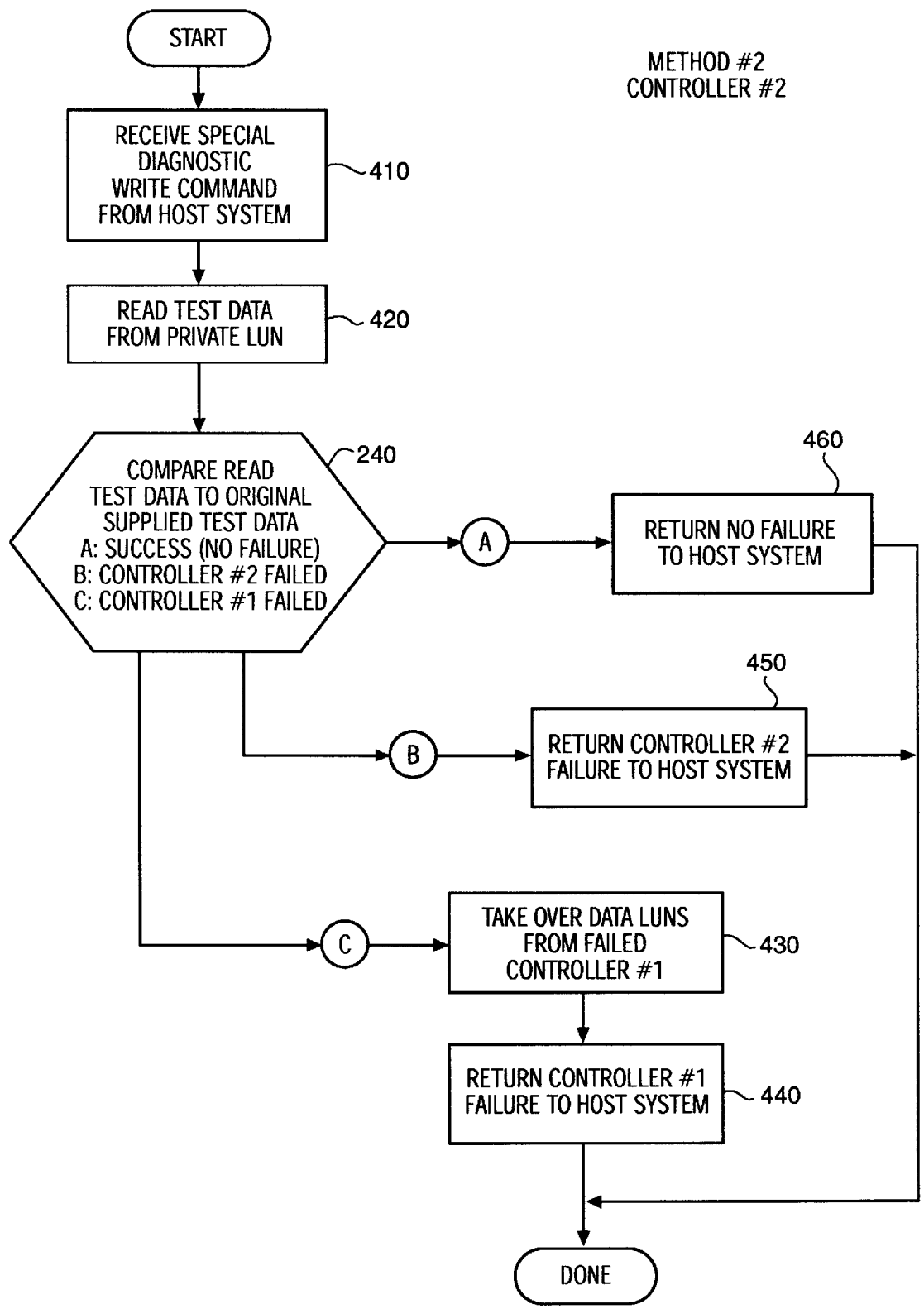
FIG. 10 is a flowchart describing the operation of the second controller in accordance with a second embodiment of the invention.

FIG. 10 shows a method of the second embodiment cooperable within a second controller 118.2. Element 410 indicates that a special diagnostic write command is received by the second controller 118.2 from the host computer 120.1. The special diagnostic write commands provide the test data which should have been written to the private LUN by operation of the methods in the first controller 118.1 described above. Element 420 then shows the second controller 118.2 reading test data from the private LUN that was written by the first controller 118.1. Element 240 indicates that the read test data is compared to the original test data supplied in the special diagnostic write command received from the host. Element 240 of FIG. 10 is similar to element 240 in FIG. 4 and as described in additional detail in FIG. 6. The labeled paths A, B and C correspond to the three outcomes in the comparison performed by element 240. Specifically, the outcome directed to label A indicates that the comparisons resulted in no detected failure of either controller. Such a success status is returned to the host by element 460. The outcome directed to label B indicates a failure of the second controller 118.2, the controller performing the comparison and finding a probable failure in its redundancy computation means. The first controller 118.1 will eventually takeover control of the data LUNs normally controlled by this failed second controller 118.2. Element 450 returns to the host such a failed status for the second controller 118.2. Lastly, the outcome directed to label C indicates a probable failure in the operation of the first controller 118.1. Element 430 therefore initiates takeover processing by the second controller 118.2 to assume control of the data LUNs previously controlled by the failed first controller 118.1. Such a status is then returned to the host by the second controller 118.2 by operation of element 440. The method of the second controller 118.2 thereby complete processing.

As noted above, the methods of both the first and second embodiments may be enhanced by addition of timed event alert messaging among the redundant controllers. As noted above with respect to element 380 of FIG. 9, a timer is restarted each time the first controller 118.1 receives a diagnostic write command from a host system. This time is used to enhance the methods of the second embodiment as described below with respect to FIGS. 11 and 12.

Such timer and event messaging techniques, often generally referred to as watchdog timers, are well known in redundant systems. Though depicted here only with respect to the methods applied to the shared bus configuration (second embodiment), such timer and event messaging techniques are equally applicable to the methods described above with respect to the first embodiment. Those skilled in the art will readily recognize the applicability of such techniques largely regardless of the particular communication topology selected.

Figure 11:
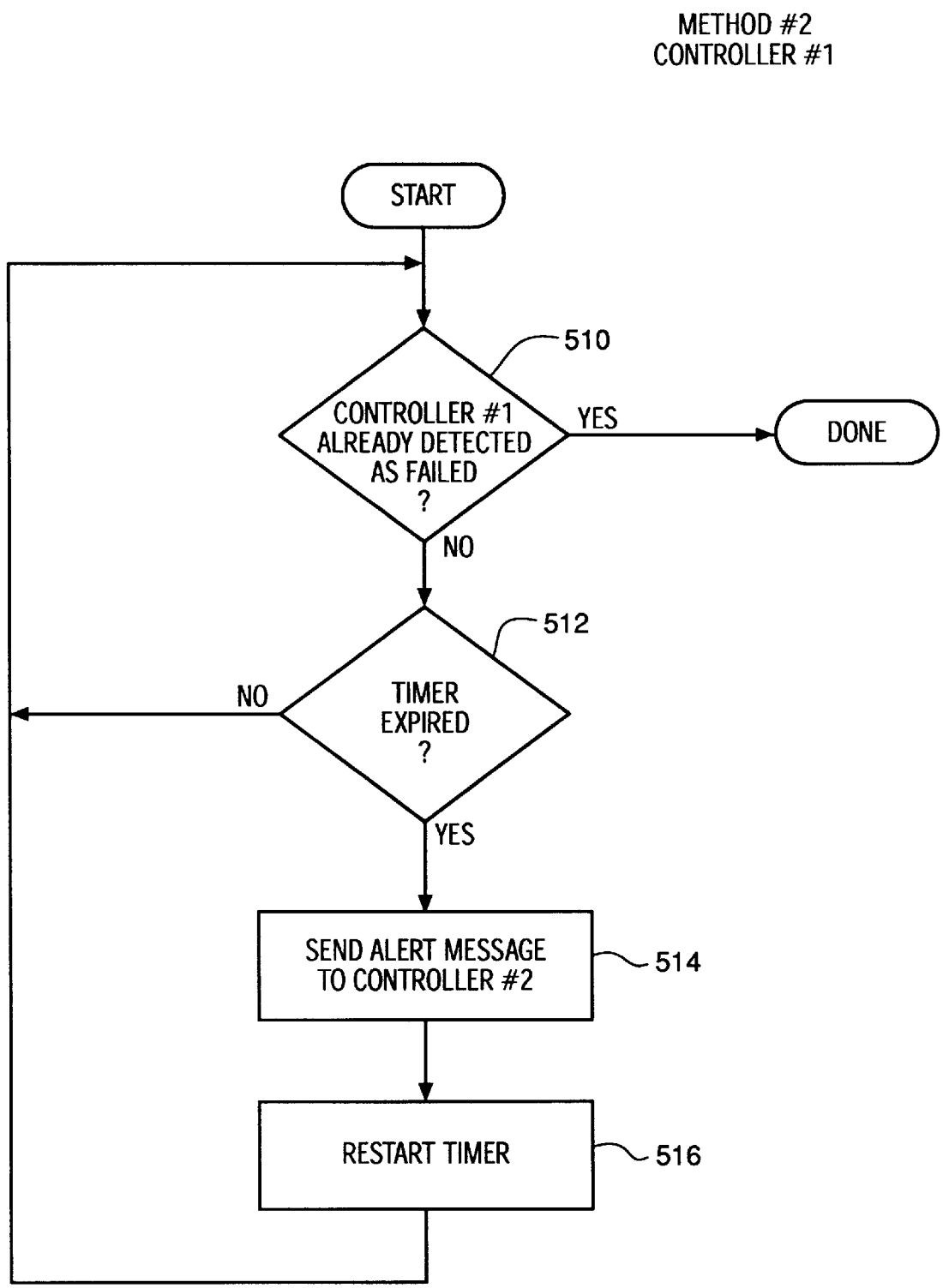
FIG. 11 is a flowchart describing timing steps of the first controller in accordance with a second embodiment of the invention.

FIG. 11 shows a method of the second embodiment operable within the first controller 118.1 to test for failure of data paths between controller and host computer. Element 510 detects whether the first controller has already been determined to have failed by operation of other tests described above. If the first controller 118.1 is so sensed to be in a failed state, the method completes. If there has not been a failure of the first controller 118.1, then the process continues with element 512. Element 512 determines if the timer, restarted by element 380 in FIG. 9, has reached its time limit and expired. If it has not, then the process continues looping back to element 510 to repeat its processing (after a suitable delay time). If the time has expired, then the process continues with element 514. An alert message is sent to the second controller 118.2 indicating that the host has not been heard from by the first controller 118.1. This may indicate that there is a problem in the path between the host computer and the first controller 118.1. However, an alternative is that no diagnostic message was sent by the host for reasons unknown to the first controller 118.1. The second controller 118.2, as described below will then determine if the possible failure in fact indicates a failure of the first controller 118.1. Element 516 is then operable to restart the timer again and the process continues by looping back to element 510 (following a suitable delay period).

Figure 12:
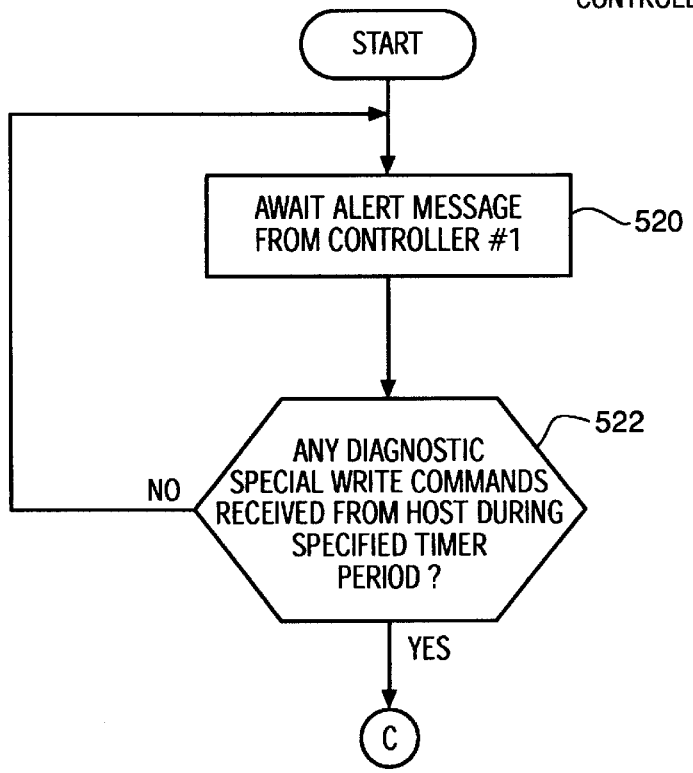
FIG. 12 is a flowchart describing timing steps of the second controller in accordance with a second embodiment of the invention.

FIG. 12 a method of the second embodiment operable within the second controller 118.2 of a timed operation that checks data paths between controllers. Element 520 awaits receipt of an alert message by the second controller 118.2 from the first controller 118.1. When such an alert message is received, element 522 is operable to determine if any special diagnostic write commands have been received from the host in a specified time (preferably the time period used to reset the timer of the first controller 118.1). If special diagnostic write commands have been received by the second controller 118.2 from the host computer during this period, then it is presumed that the first controller 118.1 has failed or that its connection with the host computer has failed. Therefore the process continues at label C of FIG. 10 to initiate takeover processing by the second controller 118.2 of the data LUNs controlled by the failed first controller 118.1. If the second controller 118.2 has not received a special diagnostic write command from the host computer, then it presumes that there is no problem with the first controller 118.1 or its connection with the host (i.e., no diagnostic write command was sent by the host computer to either controller). In this case, the alert message is ignored by the second controller 118.2 and processing continue by looping back to element 520 to await another alert message from the first controller 118.1.

The methods of the embodiments described above are advantageous in that by using a private LUN striped across all disk drive channels of the array, each of the channels can be individually tested. By enhancing these tests with the timed failure testing, data paths between controllers and host computers can be tested. Thus a more precise diagnosis of the system can be achieved. Those skilled in the art will recognize many other features and aspects of the storage subsystem which may be more effectively tested by use of a private LUN within the storage subsystem.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for detecting failure in one or more of a plurality of controllers in a storage subsystem having a data storage area, said method comprising the steps of:

reserving a portion of said data storage area for a private LUN wherein said private LUN is not generally accessible by standard system or application processes in attached host systems;

sending a diagnostic write command from a first controller of said plurality of controllers to a second controller of said plurality of controllers, said write command including instructions for said second controller to write first data to said private LUN;

writing said first data from said second controller to said private LUN in response to receipt of said diagnostic write command;

reading second data, corresponding to said first data, by said first controller from said private LUN in response to the writing of said first data to said private LUN;

comparing in said first controller said second data read from said private LUN to said first data; and detecting if failure has occurred, in response to said comparing step.

2. The method of claim 1, wherein said second data includes a main data portion and a redundancy data portion, wherein said comparing step includes:

comparing said main data portion of said second data read from said private LUN to said first data; and checking said redundancy data portion of said second data read from said private LUN, in response to said comparing step wherein said main data portion of said second data and said first data are determined to be the same by the comparing step.

3. The method of claim 2, said checking step further including;

calculating additional redundancy data from said main data portion using a first means of said first controller; and comparing said additional redundancy data with said redundancy data portion of said second data.

4. The method of claim 3, said checking step further including:

recalculating, in response to said calculating step, further additional redundancy data from said main data portion of said second data using a second means of said first controller; and comparing said further additional redundancy data with said redundancy data portion of said second data.

5. The method of claim 1, further comprising the steps of:

determining, after sending said write command from said first controller to said second controller, if said write command is received by said second controller; and assessing, in response to said determining step, if an error has occurred in sending said write command to said second controller.

6. The method of claim 1 wherein said data storage area is a disk array having a plurality of disks distributed over a plurality of channels and wherein said private LUN comprises a stripe extending over at least one disk of said plurality of disks for every channel of said plurality of channels of said disk array.

7. A method for detecting failure in a controller of a storage subsystem having a plurality of controllers associated with a host computer using a private LUN in a data storage area of said storage subsystem, the method comprising the steps of:

sending a diagnostic write command from said host computer to a first controller of said plurality of controllers, said diagnostic write command including instructions for said first controller to write first data to said private LUN wherein said private LUN is not generally accessible by standard system or application processes in attached host systems;

writing said first data by said first controller to said private LUN;

sending a special diagnostic write command from said host computer to a second controller of said plurality of controllers, wherein said special diagnostic write command includes said first data;

reading second data, corresponding to said first data, by said second controller from said private LUN;

comparing, by said second controller, said first data to said second data; and detecting if failure has occurred, in response to said comparing step.

8. The method of claim 7, wherein said second data includes a main data portion and a redundancy data portion, wherein said comparing step includes:

comparing said main data portion of said second data to a corresponding main portion of said first data; and checking said redundancy data portion of said second data in response to said comparing step wherein said main data portion of said second data and said main data portion of said first data are determined to be the same by the comparing step.

9. The method of claim 8, said checking step further including;

calculating additional redundancy data from said main data portion using a first means of said second controller; and comparing said additional redundancy data with said redundancy data portion of said second data.

10. The method of claim 9, said checking step further including:

recalculating, in response to said calculating step, further additional redundancy data from said main data portion of said second data using a second means of said second controller; and comparing said further additional redundancy data with said redundancy data portion of said second data.

11. The method of claim 7, further comprising the steps of:

sending an alert message from said first controller to said second controller if no diagnostic write command has been received from said host computer by said first controller during a predetermined period of time;

determining that a failure has occurred in said first controller in response to receipt of said alert message within said second controller.

12. The method of claim 11 wherein step of determining includes the steps of:

determining that no failure has occurred in said first controller if no special diagnostic write command has been received by said second controller during said predetermined period of time; and determining that a failure has occurred in said first controller if any special diagnostic write command has been received by said second controller during said predetermined period of time.

13. A method for detecting failure in one or more of a plurality of controllers in a storage subsystem having a data storage area, said method comprising the steps of:

reserving a portion of said data storage area for a private LUN wherein said private LUN is not generally accessible by standard system or application processes in attached host systems;

exchanging diagnostic information among said plurality of controllers through said private LUN;

comparing said diagnostic information to predetermined expected values of said diagnostic information exchanged through said private LUN; and detecting if failure has occurred, in response to said comparing step.

14. The method of claim 13, wherein said diagnostic data includes a main data portion and a redundancy data portion, wherein said comparing step includes:

receiving said diagnostic information through said private LUN;

comparing said main data portion of said diagnostic information to said predetermined expected values thereof; and verifying said redundancy data portion in response to said comparing step wherein said main data portion is determined to be the same as said predetermined expected values by the comparing step.

15. The method of claim 14, said verifying step further including;

calculating additional redundancy data from said main data portion using a first means; and comparing said additional redundancy data with said redundancy data portion.

16. The method of claim 15, said checking step further including:

recalculating, in response to said calculating step, further additional redundancy data from said main data portion using a second means; and comparing said further additional redundancy data with said redundancy data portion.

17. The method of claim 13 wherein said data storage area is a disk array having a plurality of disks distributed over a plurality of channels and wherein said private LUN comprises a stripe extending over at least one disk of said plurality of disks for every channel of said plurality of channels of said disk array.

18. The method of claim 13 wherein said plurality of controllers each communicate with a common host system, wherein the step of exchanging further comprises the steps of:

requesting, by said host system, a first controller of said plurality of controllers to write said diagnostic information in said private LUN; and requesting, by said host system, a second controller of said plurality of controllers to read said diagnostic information from said private LUN, and wherein said predetermined expected values are supplied by said host system to said first controller and to said second controller.

19. In a storage subsystem, an apparatus for detecting failures in the operation of said storage subsystem comprising:

a plurality of disk drives having a private LUN stored thereon wherein said private LUN is not generally accessible by standard system or application processes in attached host systems;

a first controller connected to said plurality of disk drives wherein said first controller is adapted to store diagnostic information on said private LUN;

a second controller connected to said plurality of disk drives wherein said second controller is adapted to read said diagnostic information from said private LUN in response to said first controller writing said diagnostic information; and detection means within said second controller for detecting a failure in the operation of said storage subsystem by comparing said diagnostic information with predetermined expected values.

20. The apparatus of claim 19 wherein said diagnostic information includes a main data portion and a redundancy data portion and wherein said detection means includes:

comparing means for comparing said main data portion of said second data read from said private LUN to said first data; and checking means for checking said redundancy data portion of said second data read from said private LUN, in response to said comparing means wherein said main data portion of said second data and said first data are determined to be the same by the comparing step.

21. The apparatus of claim 20 wherein said checking means further comprises;

calculating means for calculating additional redundancy data from said main data portion; and second comparing means for comparing said additional redundancy data with said redundancy data portion of said second data.

22. The apparatus of claim 21 wherein said checking means further comprises:

recalculating means, responsive to said calculating means, for recalculating further additional redundancy data from said main data portion of said second data; and third comparing means for comparing said further additional redundancy data with said redundancy data portion of said second data.

23. The apparatus of claim 19 further comprising:

means for determining, after sending said write command from said first controller to said second controller, if said write command is received by said second controller; and means for assessing, in response to said means for determining, if an error has occurred in sending said write command to said second controller.

24. The apparatus of claim 19 wherein said data storage area is a disk array having a plurality of disks distributed over a plurality of channels and wherein said private LUN comprises a stripe extending over at least one disk of said plurality of disks for every channel of said plurality of channels of said disk array.

* * * * *